Dec. 31, 1968   J. C. HESSON   3,419,432
SEAL
Filed Jan. 4, 1966

Inventor
James C. Hesson
Attorney

United States Patent Office 3,419,432
Patented Dec. 31, 1968

3,419,432
SEAL
James C. Hesson, Riverdale, Ill., assignor to the United States of America as represented by the United States Atomic Energy Commission
Filed Jan. 4, 1966, Ser. No. 518,742
4 Claims. (Cl. 136—83)

ABSTRACT OF THE DISCLOSURE

A regenerating EMF cell having two molten metals separated by a molten fused salt electrolyte is contained in a pair of complementary housings with a pair of flanges having a thin portion adjacent the housing and a thick portion spaced from the housing. A ceramic insulating ring is located between the thin portions of the flanges and a rubber gasket is located between the thick portions of the flanges. Any molten salt which flows between the thin portions of the flanges is frozen because of heat loss through the flanges and does not continuously corrode the insulating rings.

---

The invention herein described was made in the course of, or under a contract with the United States Atomic Energy Commission.

This invention relates to seals operable at high temperatures and/or in highly corrosive surroundings.

Heretofore, regenerating EMF cells composed of molten metal electrodes and fused salt electrolytes, because of their operating temperatures of 500° C. to 800° C. and the corrosiveness of their electrolytes, have used ceramics as weld seals. Since the coefficient of expansion of the metal housing sections of the EMF cell is different from that of the ceramic seal welded thereto, uneven expansion and contraction, caused by heating and cooling of the cell, produce strains which cause ceramic seals larger than about 2 inches in diameter to crack.

The seal in a regenerating EMF cell serves a dual purpose: the sealing of the cell housing section from the outside atmosphere and the insulation of the cell anode from the cathode. Any material used as a substitute for the ceramic seals would have to fulfill both requirements. Nonceramic materials, such as rubber compounds and various jellies, cannot directly be applied to a regenerating EMF cell because the temperature and chemical environment of the cell is too severe. The present state of the art is such that no acceptable method is available for building reliable large-diameter EMF cells.

I have discovered a seal useful without regard to: the temperature or temperature gradient of the process and the diameter of the seal. If the seal which constitutes this invention is used in combination with an EMF cell, the sealing material will not be welded to the cell housing section, and will provide two zones of protection.

The present invention as it is applied to a molten metal regenerating EMF cell may be better understood by reference to the following description and the drawings in which.

Figure 1:
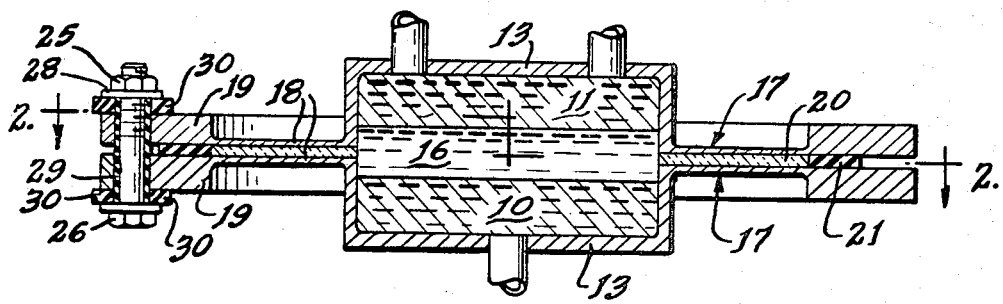
FIGURE 1 is a sectional view of an EMF cell and the seal of the present invention, taken on line 1—1 of FIG. 2.
Figure 2:
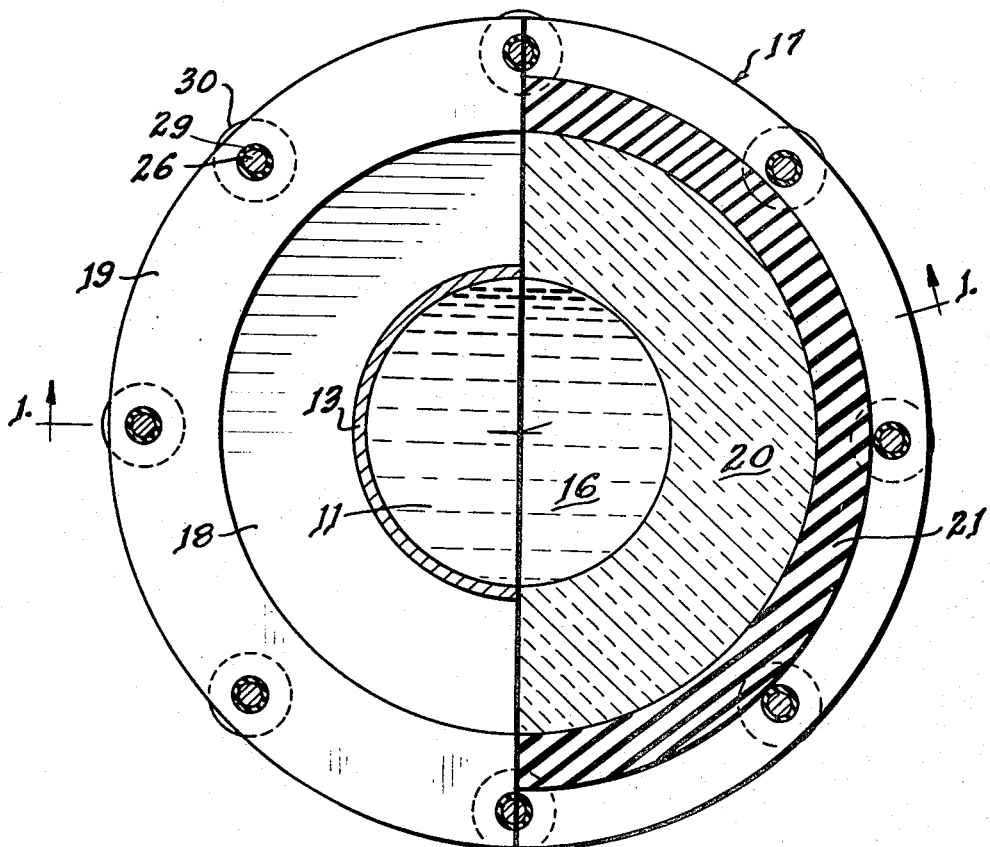
FIGURE 2 is a sectional view of the EMF cell and seal taken on line 2—2 of FIG. 1.

As shown in FIGURE 1, the EMF cell comprises molten metals 10 and 11 and a fused salt electrolyte 16 separating them. The molten metals and electrolyte are contained in a housing formed of complementary sections 13.

Each housing section 13 has at its open end an outwardly extending flange 17 comprising a relatively thin portion 18 and a relatively thick portion 19. The thin portion 18 is directly adjacent the associated housing section 13, and the thick portion 19 lies radially outward of the thin portion in spaced relation to the housing section. As will presently be made clear, the purpose of the thin portion 18 is to dissipate heat, and that of the thick portion is to clamp. The thin portions 18 of the flanges 17 of the two housing sections 13 face one another; likewise, the thick portions 19 face one another. A ceramic insulating ring 20 is held by and between the thin flange portions 18, without being welded thereto, and a gas-sealing ring 21 is held by and between the thick flange portions 19. The flanges 17 are held against the rings 20 and 21 by a plurality of nuts 25 and clamping bolts 26 engaging the same which extend through the portions 19 of the flanges 17 outward of the ring 21 and in circumferentially spaced relation to one another. On each bolt 26 there is a washer 28 engaged by the associated nut 25. On each bolt 26 there are an insulating sleeve 29 and a pair of insulating washers 30.

The fused salt electrolyte 16 at the operating temperature of the EMF cell makes contact with the ceramic insulating ring 20 and corrodes it. At some distance from the housing sections 13, between the thin flange portions 18 and the ring 20, the temperature becomes sufficiently low, because of heat loss, for the fused salt electrolyte 16 to freeze. Such freezing creates a seal or seals that prevent escape of the electrolyte out to the sealing ring 21, whose effectiveness it could materially reduce by corrosion. These freeze seals are not good enough to prevent the passage of gas, and so the gas-sealing ring 21 is required.

As the fused salt electrolyte 16 is not a conductor of electricity, it might be used to electrically insulate the thin portions 18, instead of the insulating ring 20. However, during the operation of these molten metal EMF cells, metal migrates through the fused salt electrolyte 16; if any of this metal lodged between the flanges 17, the cell would short circuit. The use of the insulating ring 20, apart from the fused salt electrolyte 16, is a distinct advantage for the reliability of the cell.

The important factors in the design of EMF cells are two: the environmental temperature of gas-sealing ring 21 and the physical separation of fused salt electrolyte 16 from gas-sealing ring 21. The present invention makes both factors independent of the cell diameter and functions of the amount of heat dissipated from the thin portions 18 of flanges 17, which may be controlled by either the choice of material for and/or the construction of the flanges 17.

The following examples further explain the seal of this invention as it is applied to a molten metal, fused salt EMF cell.

EXAMPLE I

The housing section 13, which were of stainless steel and had an internal diameter of 3", were opened and a frozen block of fused salt electrolyte 16, a eutectic mixture composed of 6.1 w/o NaF, 17.7 w/o NaCl, and 76.2 w/o NaI, was placed therein. The housing sections 13 were closed and evacuated. The denser metal 10, bismuth, was introduced from the bottom of the housing section 13; then the less dense metal 11, sodium, was introduced from the top. The cell was run at the internal temperature of about 550° C. as the melting point of the fused salt electrolyte 16 was about 535° C. The thin portions 18 of flanges 17 were $\frac{1}{32}$" in thickness and 1½ inches in radial width. The thick portions 19 of flanges 17 were $\frac{5}{16}$" in thickness and 1 inch in radial width. The insulating ring 20 between the thin portions 18 was alumina, ⅛ of an inch in thickness, 6¼ inches in outside diameter and 3¼ inches in inside diameter. The gas-sealing ring 21 was silicone rubber 20 to 30 durometer, 7¼ inches in outside diameter, 6¼ inches in inside diameter and 3/16 of an inch in thickness. During the operation of the cell at internal temperatures of about 550° C., the temperature of the silicone rubber never exceeded its melting point of about 200° C.

EXAMPLE II

The procedure for loading the cell was identical to that of Example I. The denser metal 10 was lead instead of bismuth. The cell housing section 13 was 4 inches in diameter. The insulating ring 20, alumina, was ⅛ of an inch in thickness, with an inside diameter of 4 inches and an outside diameter of 7 inches. The gas-sealing ring 21 was silicone rubber 20 to 30 durometer, 7 inches in inside diameter and an outside diameter of 8 inches. The heat-dissipating part 18 of flange 17 was 1/32 of an inch thick by 2 inches in length.

When an inert atmosphere is used instead of a vacuum, the flanges 17 must be clamped together; however, when the cell is run under a vacuum the bolts 26 are not needed to hold flanges 17 together.

Mixtures of lead and bismuth may be used instead of pure metal, and any metal in the alkali metal series may be substituted for sodium as the lighter metal 11. However, the metallic element in fused salt electrolyte 16 must correspond to the lighter metal 11. Generally, eutectic mixtures of salts are used for the fused salt electrolyte 16 so that lower melting points may be obtained, since the melting point of the fused salt electrolyte 16 usually determines the temperature at which the EMF cell must operate. As the operational temperature of the EMF cell drops, the required temperature differential between housing section 13 and gas-sealing ring 21 becomes smaller. This temperature drop is the most critical design factor for an EMF cell with the seal of this invention, and any diameter cell may be constructed so long as the thin portions 18 of flanges 17 dissipate enough heat to establish the required temperature differential.

The examples set out herein are illustrative of specific embodiments of the invention. They are not intended to define the limits of the invention; such is the purpose of the appended claims.

What is claimed is:

1. In an electric battery comprising a pair of complementary housing sections having adjacent open ends and containing in one section a first molten metal, in the other section a second molten metal spaced from the first molten metal, and a molten salt electrolyte entirely filling the space between the molten metals; the combination therewith of;

(a) a pair of flanges attached to the open ends of the housing sections and extending radially outward therefrom, each flange having a heat-dissipating portion adjacent the associated housing section and a clamping portion radially outward of the heat-dissipating portion, the heat-dissipating portions facing one another, the clamping portions facing one another;

(b) an insulating ring of relatively great radial width located between and in contact with the heat-dissipating portions of the flanges and being free of a weld to said portions, the inner periphery of said ring defining said space formed by the molten salt and said periphery being in contact with the molten salt;
   escape of the salt radially outward of the insulating ring being prevented by freezing of the salt between the insulating ring and the heat-dissipating portions of the flanges due to the relatively great radial width of the insulating ring and the heat dissipation by the heat-dissipating portions of the flanges;

(c) a gas-sealing ring located radially outward of the insulating ring between and in contact with the clamping portions of the flanges; and (d) means located radially outward of the gas-sealing ring and acting against the clamping portions of the flanges to clamp the flanges against the rings.

2. The combination specified in claim 1, wherein the heat-dissipating portions of the flanges are relatively thin, and the clamping portions of the flanges are relatively thick.

3. The combination specified in claim 2, the insulating ring being formed of alumina and having an outside diameter of 6¼ inches, an inside diameter of 3¼ inches and an axial thickness of ⅛ of an inch; the gas-sealing ring being formed of silicone rubber and having an outside diameter of 7¼ inches, an inside diameter of 6¼ inches and an axial thickness of 3/16 of an inch; the flanges being formed of stainless steel and the thin portions having a length of 1½ inches and a thickness of 1/32 of an inch.

4. The combination specified in claim 2, the insulating ring being formed of alumina and having an outside diameter of 7 inches, an inside diameter of 4 inches and an axial thickness of ⅛ of an inch; the gas-sealing ring being formed of silicone rubber and having an outside diameter of 8 inches, an inside diameter of 7 inches and an axial thickness of 3/16 of an inch; the flanges being formed of stainless steel and the thin portions having a length of 2 inches and a thickness of 1/32 of an inch.

References Cited

UNITED STATES PATENTS

| | | | |
|---|---|---|---|
| 1,182,759 | 5/1916 | Emanuel | 136—86 |
| 2,716,670 | 8/1955 | Bacon | 136—86 |
| 3,064,065 | 11/1962 | Belove | 136—133 |
| 3,132,972 | 5/1964 | Ludwig | 136—86 |
| 3,147,149 | 9/1964 | Postal | 136—153 |
| 3,245,836 | 4/1966 | Agruss | 136—83 |
| 3,285,784 | 11/1966 | Babusci et al. | 136—133 |
| 3,288,647 | 11/1966 | Beigelman et al. | 136—86 |
| 3,326,722 | 6/1967 | Hasbrouck | 136—133 |

WINSTON A. DOUGLAS, Primary Examiner.

C. F. LE FEVOUR, Assistant Examiner.

U.S. Cl. X.R.

136—86, 133